US010643373B2

(12) United States Patent
Fillhardt et al.

(10) Patent No.: US 10,643,373 B2
(45) Date of Patent: May 5, 2020

(54) AUGMENTED REALITY INTERFACE FOR INTERACTING WITH DISPLAYED MAPS

(71) Applicant: Apple Inc., Cupertino, CA (US)

(72) Inventors: Nathan L. Fillhardt, Scotts Valley, CA (US); Adrian P. Lindberg, San Jose, CA (US); Vincent P. Arroyo, Union City, CA (US); Justin M. Strawn, San Anselmo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/981,847

(22) Filed: May 16, 2018

(65) Prior Publication Data

US 2018/0365883 A1 Dec. 20, 2018

Related U.S. Application Data

(60) Provisional application No. 62/521,895, filed on Jun. 19, 2017.

(51) Int. Cl.
| | |
|---|---|
| *G06T 15/20* | (2011.01) |
| *G06T 7/70* | (2017.01) |
| *G01C 21/36* | (2006.01) |
| *G06T 19/00* | (2011.01) |
| *G06F 3/0346* | (2013.01) |
| *G06F 3/01* | (2006.01) |

(52) U.S. Cl.
CPC .......... *G06T 15/20* (2013.01); *G01C 21/3638* (2013.01); *G06F 3/011* (2013.01); *G06F 3/0346* (2013.01); *G06T 7/70* (2017.01); *G06T 19/006* (2013.01)

(58) Field of Classification Search
None
See application file for complete search history.

(56) References Cited

U.S. PATENT DOCUMENTS

| 8,823,697 B2 | 9/2014 | Woo et al. |
| 9,013,550 B2 | 4/2015 | Jiang et al. |
| (Continued) | | |

FOREIGN PATENT DOCUMENTS

| EP | 0 838 787 A2 | 4/1998 |
| WO | 2015010165 A1 | 1/2015 |
| (Continued) | | |

OTHER PUBLICATIONS

Office Action issued in China Application No. CN201821405845.9, dated Feb. 1, 2019 in 2 pages.
(Continued)

*Primary Examiner* — Hilina K Demeter
(74) *Attorney, Agent, or Firm* — Kilpatrick, Townsend and Stockton LLP

(57) ABSTRACT

Various embodiments of the disclosure pertain to an augmented or virtual reality interface for interacting with maps displayed from a virtual camera perspective on a mobile device. Instead of manipulating the position of the virtual camera using a touchscreen interface, some embodiments allow a spatial location of the mobile device to control the position of the virtual camera. For example, a user can tilt the mobile device to obtain different angles of the virtual camera. As another example, the user can move the mobile device vertically to change the height of the virtual camera, e.g., a higher altitude above the ground.

19 Claims, 11 Drawing Sheets

(56) References Cited

U.S. PATENT DOCUMENTS

| | | |
|---|---|---|
| 9,508,146 B2 | 11/2016 | Davies et al. |
| 9,558,557 B2 | 1/2017 | Jiang et al. |
| 2008/0297474 A1* | 12/2008 | Blomqvist ............ G06F 1/1626 345/158 |
| 2011/0169946 A1* | 7/2011 | Rudin ..................... G01S 5/16 348/135 |
| 2012/0041675 A1 | 2/2012 | Juliver et al. |
| 2012/0120101 A1 | 5/2012 | Adhikari et al. |
| 2012/0249416 A1 | 10/2012 | Maciocci et al. |
| 2013/0038609 A1* | 2/2013 | Tsai ...................... G01C 21/20 345/419 |
| 2013/0125027 A1 | 5/2013 | Abovitz |
| 2013/0178257 A1 | 7/2013 | Langseth |
| 2013/0322702 A1* | 12/2013 | Piemonte .............. G06T 15/005 382/113 |
| 2014/0229287 A1 | 8/2014 | Ben-David et al. |
| 2014/0267399 A1 | 9/2014 | Zamer |
| 2014/0267411 A1 | 9/2014 | Fein et al. |
| 2014/0278847 A1 | 9/2014 | Gallo |
| 2015/0070347 A1 | 3/2015 | Hofmann et al. |
| 2015/0323327 A1 | 11/2015 | Lord et al. |
| 2015/0334012 A1 | 11/2015 | Butler et al. |
| 2015/0362520 A1* | 12/2015 | Wells ..................... G01C 19/00 702/141 |
| 2016/0214016 A1 | 7/2016 | Stafford |
| 2016/0217614 A1 | 7/2016 | Kraver et al. |
| 2016/0240010 A1 | 8/2016 | Rosenthal et al. |
| 2016/0300389 A1 | 10/2016 | Glenn, III et al. |
| 2017/0094161 A1 | 3/2017 | Graham et al. |
| 2017/0168566 A1 | 6/2017 | Osterhout et al. |
| 2018/0088339 A1 | 3/2018 | Aruga |
| 2018/0367839 A1 | 12/2018 | Vandoros |
| 2019/0179423 A1 | 6/2019 | Rose et al. |

FOREIGN PATENT DOCUMENTS

| | | |
|---|---|---|
| WO | 2015/145139 A1 | 10/2015 |
| WO | 2015/192117 A1 | 12/2015 |
| WO | 2016/076951 A1 | 5/2016 |

OTHER PUBLICATIONS

International Search Report and Written Opinion issued in PCT Application No. PCT/US2018/044290, dated Jan. 21, 2019 in 18 pages.

Invitation to Pay Additional Fees and, Where Applicable, Protest Fee issued in PCT Application No. PCT/US2018/044290, dated Nov. 12, 2018, 13 pages.

International Search Report and Written Opinion dated Aug. 10, 2018 in International Application No. PCT/US2018/033053. 15 pages.

Non-Final Office Action issued in U.S. Appl. No. 15/867,351, dated Mar. 28, 2019 in 22 pages.

Final Office Action issued in U.S. Appl. No. 15/867,351, dated Jul. 9, 2019 in 28 pages.

Office Action issued in China Application No. CN201821405845.9, dated May 14, 2019 in 2 pages.

Office Action issued in China Application No. CN201821405845.9, dated Mar. 12, 2019 in 2 pages.

Non-Final Office Action issued in U.S. Appl. No. 15/867,351, dated Jan. 2, 2020 in 18 pages.

International Preliminary Report on Patentability issued in PCT Application No. PCT/US2018/033053, dated Jan. 2, 2020 in 10 pages.

* cited by examiner

AUGMENTED REALITY INTERFACE FOR INTERACTING WITH DISPLAYED MAPS

CROSS-REFERENCES TO RELATED APPLICATIONS

This application claims the benefit of U.S. Provisional Patent Application No. 62/521,895, filed Jun. 19, 2017, and is hereby incorporated by reference in its entirety.

BACKGROUND

Modern phones can provide location information via a map application. The view of a map is typically a top down view (i.e., an overhead view) of a grid of streets. The top down view may also provide a satellite image. When a user is at a particular view of a map, the user may wish to have a three dimensional (3D) view. The 3D view can be provided from a perspective of a virtual camera. Typically, the position of the virtual camera is specified via a touchscreen interface through gestures (i.e., a touch, a drag, a rotation, etc.). The possible positions of the virtual camera are typically restricted to a specified angle at different heights.

BRIEF SUMMARY

Instead of manipulating the position of the virtual camera using a touchscreen interface, some embodiments allow a spatial location of the mobile device to control the position of the virtual camera. For example, a user can tilt the mobile device to obtain different angles of the virtual camera. As another example, the user can move the mobile device vertically to change the height of the virtual camera, e.g., a higher altitude above the ground.

To accomplish this, the location of 3D objects of the map can be registered at a spatial location relative to the mobile device. The registration can use the imaging capabilities of the mobile device's camera. The registration can set an origin position and define objects in the map relative to that origin position. The registration can occur in response to user input, e.g., selecting a button. A current location of the mobile device can also be defined with respect to the origin position, thereby providing the spatial location of the map objects relative to the mobile device. The initial position of the mobile device can be the origin position. In another example, the center point of the map can be the origin position.

Movement of the mobile device can be tracked via sensors (e.g., accelerometer, gyroscope, compass, etc.) and/or the physical camera of the device. The camera can use images of objects in the images from the physical camera to more accurately determine a location of the mobile device relative to the origin in the room, and therefore relative to the map objects. In this manner, as the mobile device moves, the virtual camera can be placed at the same location with the same orientation (e.g., pitch, yaw, and roll), thereby allowing a user to obtain a wide variety of views of the map by moving the mobile device.

In some embodiments, a method of providing an augmented or virtual view of a map on a display of a mobile device is provided. The method is performed by a mobile device having a physical camera communicably coupled with the display. The method comprises displaying a map view on the display. The map view includes a set of map objects corresponding to a location within the map from an initial virtual position of a virtual camera. The method further comprises receiving user input specifying a 3D mode that uses the physical camera. The method further comprises in response to the user input, capturing one or more first images of a physical environment within which the mobile device resides using the physical camera. The method further comprises determining an origin position of the physical camera on the physical environment using the one or more first images. The method further comprises specifying a set of physical positions of a set of 3D objects of the map relative to the original position. The set of 3D objects corresponds to the set of map objects. The method further comprises capturing one or more second images of the physical environment within which the mobile device resides using the physical camera in response to movement of the mobile device. The method further comprises determining a current physical position of the physical camera with respect to the origin position based on the one or more second images. The method further comprises determining an updated virtual position of the virtual camera based on the current physical position of the physical camera. The method further comprises rendering an image of the set of 3D objects based on the updated virtual position of the virtual camera. The method further comprises displaying the image on the display.

In some embodiments, a mobile device is provided. The mobile device comprises a display, a physical camera communicably coupled with the display, a processor and a memory coupled to the processor, the memory storing instructions, which when executed by the processor, cause the mobile device to perform operations including the steps of the disclosed methods, for example.

In some embodiments, a computer-program product is provided. The computer-program product is tangibly embodied in a non-transitory machine-readable storage medium of a host device, including instructions that, when executed by one or more processors, cause the one or more processors to perform operations including the steps of the disclosed methods, for example.

The following detailed description together with the accompanying drawings in which the same reference numerals are sometimes used in multiple figures to designate similar or identical structural elements, provide a better understanding of the nature and advantages of the present disclosure.

DETAILED DESCRIPTION

Figure 1:
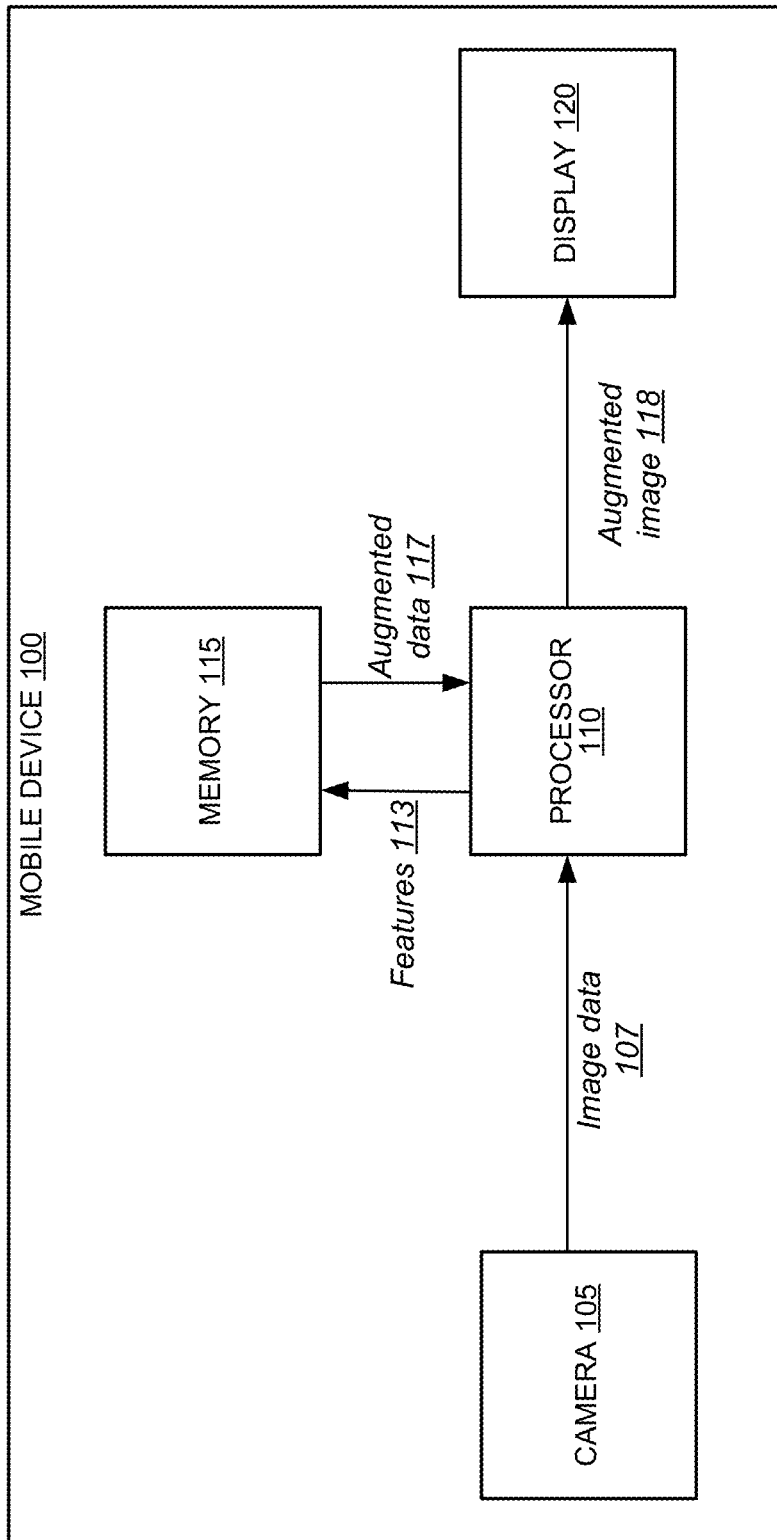
FIG. 1 shows a block diagram depicting a mobile device implementing augmented reality according to some embodiments of the present invention.

Embodiments of the present invention provide for an augmented reality and/or virtual reality interface (e.g., in that movement of the device is used) that allows for interaction with a displayed map. The interface may be implemented in association with a map or navigation application. For example, the interface may be used by a tourist to easily and intuitively interact with a three dimensional map of an unfamiliar city, without requiring fingertip manipulation on the display. The interaction may be made by physically moving (e.g., translation or rotation) the mobile device upon which the map is displayed. For example, the view of the map may be zoomed in when the mobile device is moved toward a physical object in the same room as the user, and zoomed out when the mobile device is moved away the physical object. Such zooming in and out can be determined based on analysis of changes of size and relative placement of physical objects in images of a camera of the mobile device, where the virtual map objects have a specified relationship to the physical objects. Similarly, the view of map may be shifted left when the mobile device is turned left, right when the mobile device is turned right, and the like.

The physical movement of the mobile device may be determined using one or more sensors integrated into the mobile device (e.g., gyroscopes, accelerometers, compasses, etc.). In addition or alternatively, the physical movement of the mobile device may be determined by consecutive images taken by the physical camera of the mobile device. For example, a first image may be captured showing a room with a desk, a computer, and a bookshelf, where certain map objects (e.g., buildings, street names, etc.) can be displayed on a screen of the mobile device as if they were at about the location of the computer. The map objects can be displayed alone, or parts or all of a camera image of the physical world can also be displayed. A second, subsequent image may be captured showing only the computer (e.g., encompassing more pixels of the image), indicating that the user has walked toward the computer, and thus moved toward the map objects. The physical movement of the physical camera of the mobile device toward the computer may be translated into a virtual movement of the virtual camera in the map application. In this case, the physical movement of the mobile device to be closer to the computer may be translated into a zoomed-in view of the three-dimensional map. Thus, movement of the mobile device can allow a user to control what parts of a map (e.g., a three-dimensional map) are displayed on the mobile device.

Embodiments of the present invention provide a number of advantages. New users of map applications, particularly those who may not be mobile device-savvy, may find traditional methods of manipulating maps to be difficult. For example, a user may be familiar with one-finger manipulations, such as entering an address, dropping a pin, moving the map, etc., but may be less familiar or unfamiliar with more complicated two-finger manipulations. Such two-finger manipulations may be required to rotate the map, zoom into the map, zoom out of the map, and the like. Thus, some embodiments of the invention provide an interface for interacting with a displayed map that is easy and intuitive, allowing users to interact with the displayed map by moving the mobile device. For example, a user may rotate a displayed map by rotating the mobile device.

I. Augmented and Virtual Reality

Augmented reality describes a technology in which a live view of the real world is supplemented with computer-generated data, such as text, graphics, or audio. In other words, the real world as seen by an augmented reality device is enhanced with additional features. With the use of augmented reality, the real world may become interactive and informative. For example, information about an object in a real-world scene may be overlaid onto the real-world scene to provide the user with more information about the viewed object.

Virtual reality describes a technology in which a computer-generated simulation of an image may be interacted with using real world movements, gestures or actions. For example, realistic images may be used to simulate a user's presence in a virtual environment. The user may be able to interact with the virtual environment, such as by turning his head to look around the virtual environment, or by extending his hand toward a virtual item to virtually touch or move the item.

In some embodiments, augmented or virtual reality may be implemented on a mobile device. FIG. 1 shows a block diagram depicting a mobile device 100 implementing augmented reality according to some embodiments of the present invention. In some embodiments, the mobile device 100 may be a communication device that may provide remote communication capabilities to a network. Examples of remote communication capabilities include using a mobile phone (wireless) network, wireless data network (e.g., 3G, 4G or similar networks), WiFi, Wi-Max, or any other communication medium that may provide access to a network such as the Internet or a private network. Examples of mobile devices 100 include mobile phones (e.g., cellular phones), PDAs, tablet computers, net books, laptop computers, personal music players, handheld specialized readers, watches, fitness bands, wearables, etc., as well as automobiles with remote communication capabilities. The mobile device 100 may comprise any suitable hardware and software for performing such functions, and may also include multiple devices or components (e.g., when a device has remote access to a network by tethering to another device—i.e., using the other device as a modem—both devices taken together may be considered a single communication device).

The mobile device 100 may include hardware components, such as a camera 105, a processor 110, a memory 115, and a display 120. Although illustrated and described as being internal to the mobile device 100, it is contemplated that any or all of these hardware components may alternatively or additionally be implemented external to and/or remote from the mobile device 100. To implement augmented reality, the camera 105 may be used to capture image data 107 of a live, real-world view. For example, the camera 105 may capture a live, moveable image of the environment positioned in front of the camera 105 at a given moment. The camera 105 may transmit the image data 107, as a single live image or a video, to the processor 110. The camera 105 may be a physical camera.

The processor 110 may process the image data 107 to extract features 113 from the image data 107. The processor 110 may analyze the image data 107 to determine whether particular objects are present in the image data 107. For example, the processor 110 may run a classifier on the image data 107 to identify images of people in the image data 107 based on common features of people (e.g., a head, a face, a body, arms, legs, hands, feet, typical movement profiles, etc.). Similarly, the processor 110 may run a classifier on the image data 107 to identify other particular objects present in the image data 107. These identified objects may be passed as features 113 to the memory 115.

The processor 110 may use the features 113 to retrieve augmented data 117 from the memory 115. For example, a feature 113 may be "dog". As facilitated by the processor 110, the memory 115 may be searched for database entries corresponding to "dog". One or more of the database entries may be passed back to the processor 110 as augmented data 117. The augmented data 117 may include any data relevant to the features 113, such as text (e.g., a description, a definition, a website address, etc.), a graphic, audio, video, an interactive element, and/or the like.

The processor 110 may receive the augmented data 117 and overlay the augmented data 117 onto the image data 107. The augmented data 117 may specify the features 113 to which the augmented data 117 is relevant. Thus, the processor 110 may locate the features 113 in the image data 107 and overlay the augmented data 117 at a particular location. As examples, the particular location may be proximate to the relevant feature 113, be overlapping with the relevant feature 113, be associated with the relevant feature 113 (e.g., with an arrow, point, pin, highlight, or other indicator to the feature 113), be in a popup box or window, and/or the like.

The image data 107 with the overlaid augmented data 117 may together form an augmented image 118 that is transmitted to the display 120. The display 120 may display the augmented image 118 on the mobile device 100. In some embodiments, the display 120 may allow interaction with the augmented image 118, such as zooming in, zooming out, cropping, selecting a link (e.g., to a website or file), modifying, editing, and/or the like. This interaction may be facilitated by an input element (not shown) that provides input commands to the processor 110, such as a touchscreen element incorporated into the display, a mouse, a trackpad, a trackball, a keyboard, a microphone, and/or the like.

II. Map Applications

A map application may be implemented on a mobile device to assist a user in finding a location. The map application may display a map of the user's current location. The user may enter an address, drop a pin, and/or search for another location in the map application. The map application may display the location and, in some embodiments, allow manipulation of the view of the map displaying the location. For example, the map application may allow the user to zoom in, zoom out, rotate, display labels, hide labels, etc. The map application may further allow the user to perform one or more functions relative to the displayed location, such as to calculate and display directions from the user's current location to the displayed location, display traffic, change from a two dimensional to a three dimensional view and vice versa, change from a map view to a satellite view and vice versa, etc.

Map applications may implement graphical user interfaces, such as those depicting a two dimensional map view in a map application. An address may be entered into the map application (e.g., "2 Embarcadero Center, San Francisco, Calif."). The map application may retrieve and display map data including the entered address. In some examples, the map application may display the map data in a two dimensional map view. The map application may further drop a pin or other indicator at the entered address. The map data may include roads, road names, cities, city names, neighborhoods, landmarks, parks, businesses, public transportation, and/or the like.

In some examples, the graphical user interface may be zoomed in to show a closer view of the entered address. The zoomed in view may provide more detailed map data, such as more road names and more features (e.g., businesses and landmarks), with respect to what is shown in the original map view. To zoom in, a user may use his fingertips to manipulate the original map. For example, the user may place two fingertips on the original map, then spread his fingertips apart in order to zoom in and arrive at a more detailed map. This motion may not be intuitive for some users.

III. Movement Interface for Interacting with Map

Some embodiments of the present invention provide a movement-controlled user interface that allows for intuitive interaction with a displayed map, without requiring fingertip manipulation on the display. The interaction may be made by physically moving (e.g., translation and/or rotation) the mobile device upon which the map is displayed. For example, the map may be zoomed in when the mobile device is moved away from the user (e.g., toward an object in view), and zoomed out when the mobile device is moved toward the user (e.g., away from an object in view). Similarly, the map may be shifted left when the mobile device is rotated left, up when the mobile device is rotated upward, and the like. In this sense, the mobile device may implement a virtual reality interface in which the map is the virtual environment and the movement of the mobile device is the user's real world interaction with the virtual environment.

A. Display of Virtual Map Based on Movement of Mobile Device

Figure 2A:
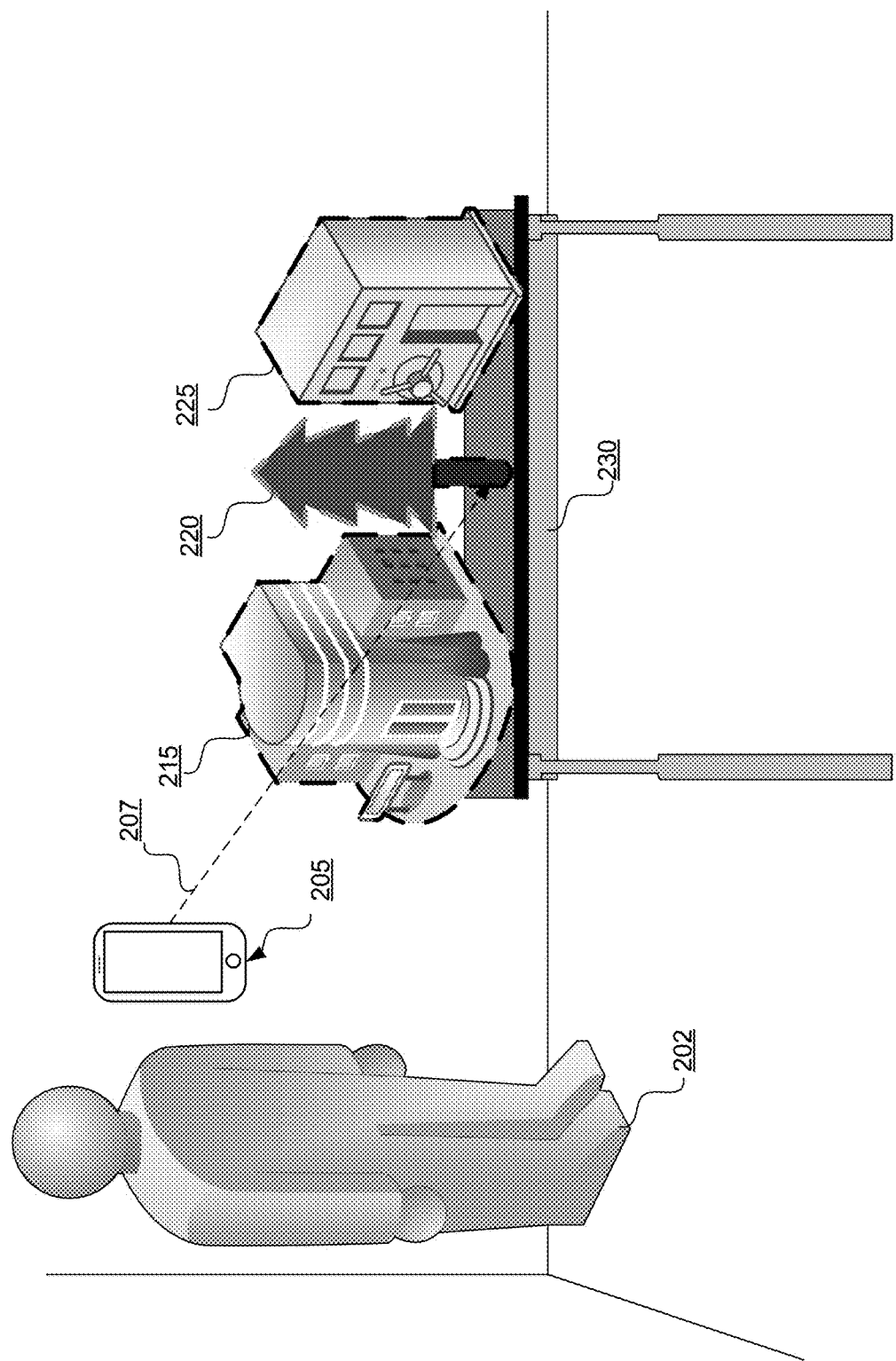
FIG. 2A shows a diagram depicting a user using a mobile device to register and view an augmented reality virtual map as if a three-dimensional map existed in a room according to some embodiments of the present invention.

In some embodiments, an interface may be provided in which a virtual map image may be displayed on a mobile device, and in some embodiments, overlaid on a real world image. FIG. 2A shows a diagram depicting a user 202 using a mobile device to view a virtual map according to some embodiments of the present invention. Specifically, the user 202 may use a physical camera of the mobile device at initial position 205 to capture an image of the desk 230. The mobile device may identify desk 230 as a suitable surface (e.g., a horizontal surface or flat surface) on which to overlay a map image including three dimensional map objects (e.g., building 215, tree 220, and bank 225). Thus, the mobile device may display the three dimensional map objects onto the desk 230 as seen on the display of the mobile device. Thus, building 215, tree 220, and bank 225 may appear to be positioned on the desk 230 such that the base of the objects appear to be positioned on the desk 230 with the objects protruding from the desk 230. The dashed lines in FIG. 2A indicate that these map objects are only seen by a user when viewing a display of the mobile device. In FIG. 2A, the building 215 may appear to be closest to the user 202, followed by the tree 220 and the bank 225, e.g., when the user 202 is viewing the display of the mobile device as a camera of the mobile device is pointed at the desk 230. Although shown and described herein with respect to a desk 230, it is contemplated that building 215, tree 220, and bank 225 may be rendered onto any arbitrary horizontal plane. Further, it is contemplated that the rendering of building 215, tree 220, and bank 225 may be not be limited to a set region (e.g., the bounds of desk 230), but may rather render to the user 202 as if the image goes to the horizon.

The physical camera may have a viewpoint represented by a registration vector 207 at which the tree 220 is at a default origin position. The default origin position may be, for example, the central point in the physical camera's initial field of view. The origin position may reflect the initial view of the physical camera, with the location of the map objects defined with respect to that origin position. For example, the building 215 may be defined at a position three inches to the left and one inch ahead of the origin position, the tree 220 may be defined at the origin position, and the bank 225 may be defined at a location two inches to the right and one inch behind the origin position. These locations with respect to the origin position may be used to register the positions of the map objects relative to any movement of the mobile device at initial position 205.

The mobile device may then be moved around the desk 230, still pointed at the desk 230, and the map image may be continuously rendered to reflect the changes in position and orientation, such that the map image appears to be an interactive three-dimensional model on the desk 230. Such movement of the mobile device can control a virtual position of a virtual camera that is used to render the images of the virtual three-dimensional model. The three-dimensional model may be moved, repositioned, zoomed, and otherwise interacted with by a user via movement of the mobile device implementing the augmented reality interface.

Figure 2B:
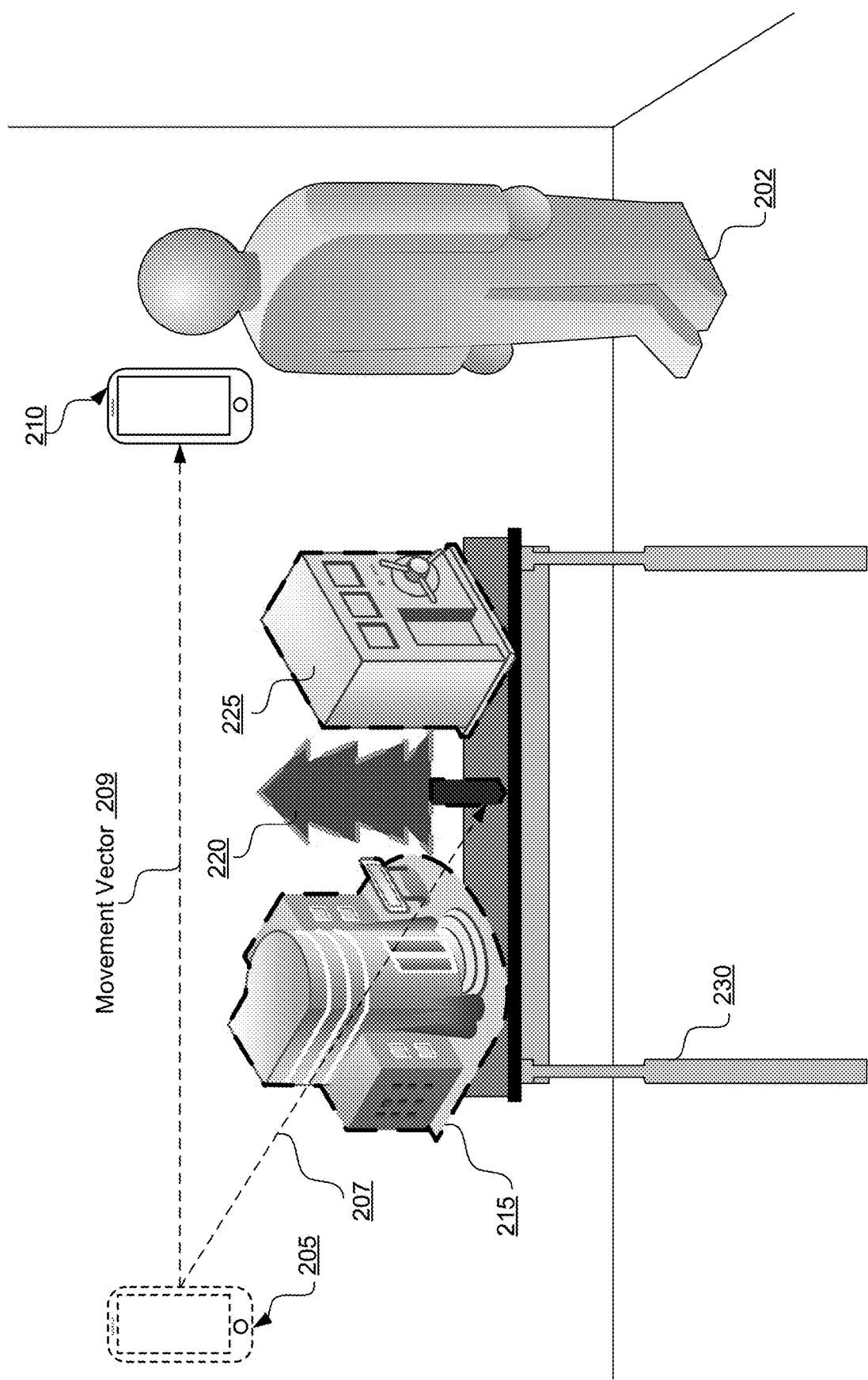
FIG. 2B shows a diagram depicting a user using a movement-controlled user interface of the augmented reality virtual map to view the three-dimensional map from a different perspective with respect to FIG. 2A according to some embodiments of the invention.

FIG. 2B shows a diagram depicting the user 202 using the mobile device to view an augmented reality virtual map from a current position 210 with respect to FIG. 2A according to some embodiments of the invention. In FIG. 2B, the user 202 has moved the mobile device from initial position 205 to current position 210. This change in position from position 205 to position 210 may be represented by a movement vector 209 that shows the movement of the mobile device from the left side of the desk 230 to the right side of the desk 230. The movement vector 209 may define movement of the mobile device relative to its initial position 205. The current position 210 of the mobile device may be defined by its initial position 205 relative to the origin position and the movement vector 209. In some embodiments, the movement vector 209 may be scaled to the map image to reflect the movement with respect to the three-dimensional map objects (e.g., building 215, tree 220, and bank 225). In other words, the movement vector 209 may be scaled to a different amount of movement of the map objects. For example, every inch of movement of the physical camera may be scaled to five feet of movement of the virtual camera used to view the map objects. After moving to the current position to the right of the desk 230, the bank 225 may appear closest to the user 202, followed by the tree 220 and the building 215.

Figure 2C:
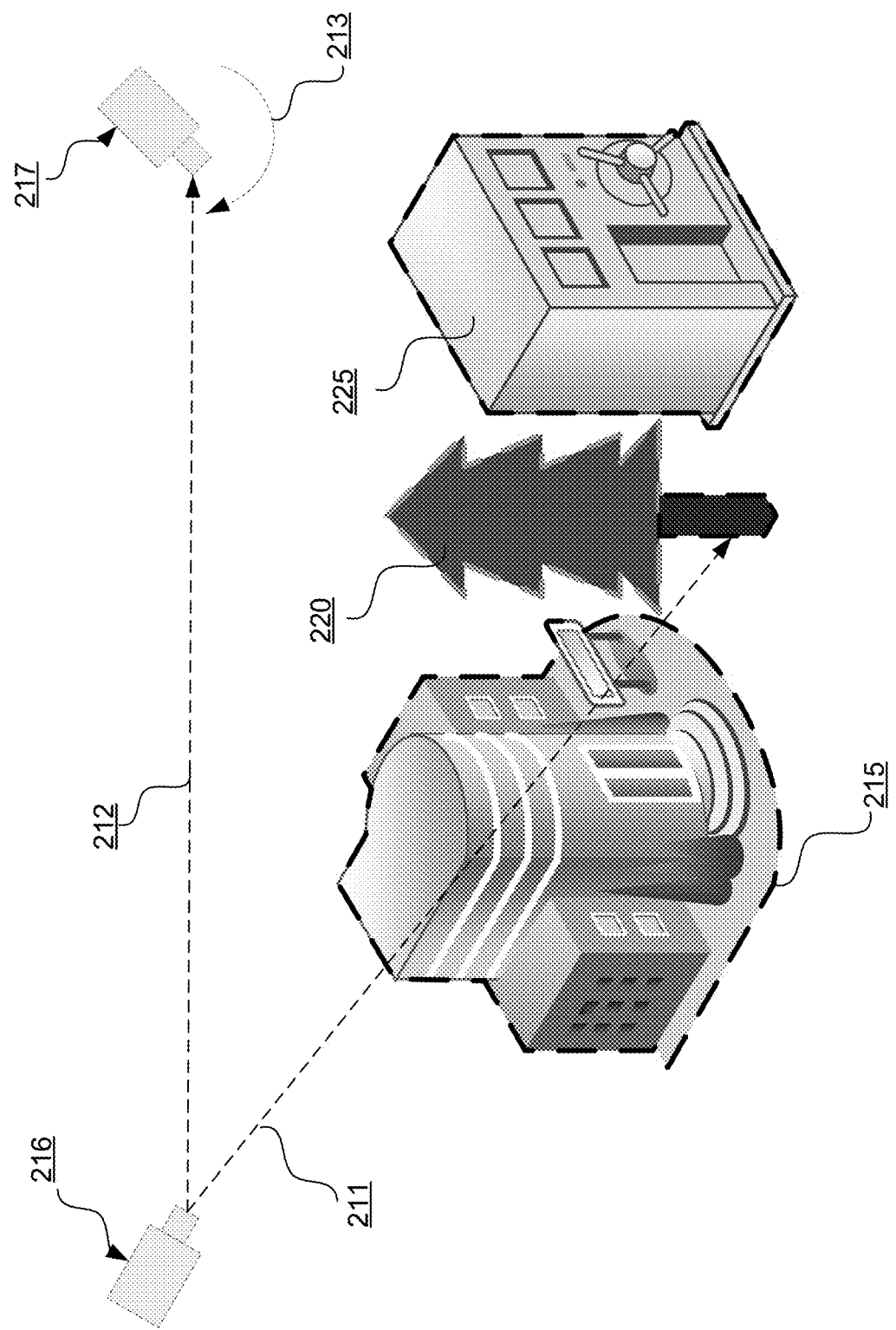
FIG. 2C shows a movement of a virtual camera to view a virtual map as controlled by movement of a mobile device according to some embodiments of the present invention.

FIG. 2C shows movement of a virtual camera to view an augmented reality virtual map as controlled by movement of a mobile device according to embodiments of the present invention. As stated above, the mobile device may have a physical camera that may capture images of the real world. The mobile device may be associated with a virtual camera at an initial position 216 in the virtual map environment, the perspective of which is used to display the map objects (e.g., building 215, tree 220, and bank 225). The origin position and registration vector 207 defined by the physical camera may correspond to an origin position and registration vector 211 defined by the virtual camera. The origin position defined by the virtual camera may be a position in the virtual map around which the positions of map objects are registered. The registration vector 211 may define the initial position 216 and perspective of the virtual camera with respect to the origin position.

When the mobile device is moved and rotated around the desk 230, as shown in FIG. 2B, the map image may be continuously rendered to reflect the changes in position and orientation. For example, the mobile device may be moved from an initial position 205 and orientation to a current position 210 and orientation. Correspondingly, the virtual camera may be moved from initial position 216 and orientation to current position 217 and orientation. Orientation vector 213 may illustrate the rotation of the virtual camera in association with a rotation of the mobile device from an initial position 205 to a current position 210, which may be defined as a 6-dimensional vector of 3 translation coordinates and 3 rotation angles. The map objects (e.g., building 215, tree 220, and bank 225) may then be rendered from the perspective of the virtual camera 217, at its current position and orientation. Thus, the virtual camera at the initial position 216 may view an image of the backside of building 215, tree 220, and bank 225 from nearest to farthest (e.g., corresponding to position of the mobile device 205 in FIG. 2A), while the virtual camera at the current position 217 may view an image of the front side of bank 225, tree 220, and building 215 from nearest to farthest (e.g., corresponding to position of the mobile device 205 in FIG. 2B). A height of the mobile device can also control the height of the virtual camera.

FIGS. 2A-C describe the rendering of the virtual building 215, tree 220, and bank 225 onto the camera-captured image of the real world desk 230. However, it is contemplated that, in some embodiments, the images captured by the camera of the mobile device 205 are not displayed on the mobile device 205. In other words, the virtual map including the virtual building 215, tree 220, and bank 225 may not be overlaid onto a real world image (e.g., onto real world desk 230).

B. Registration Outdoors

Figure 3:
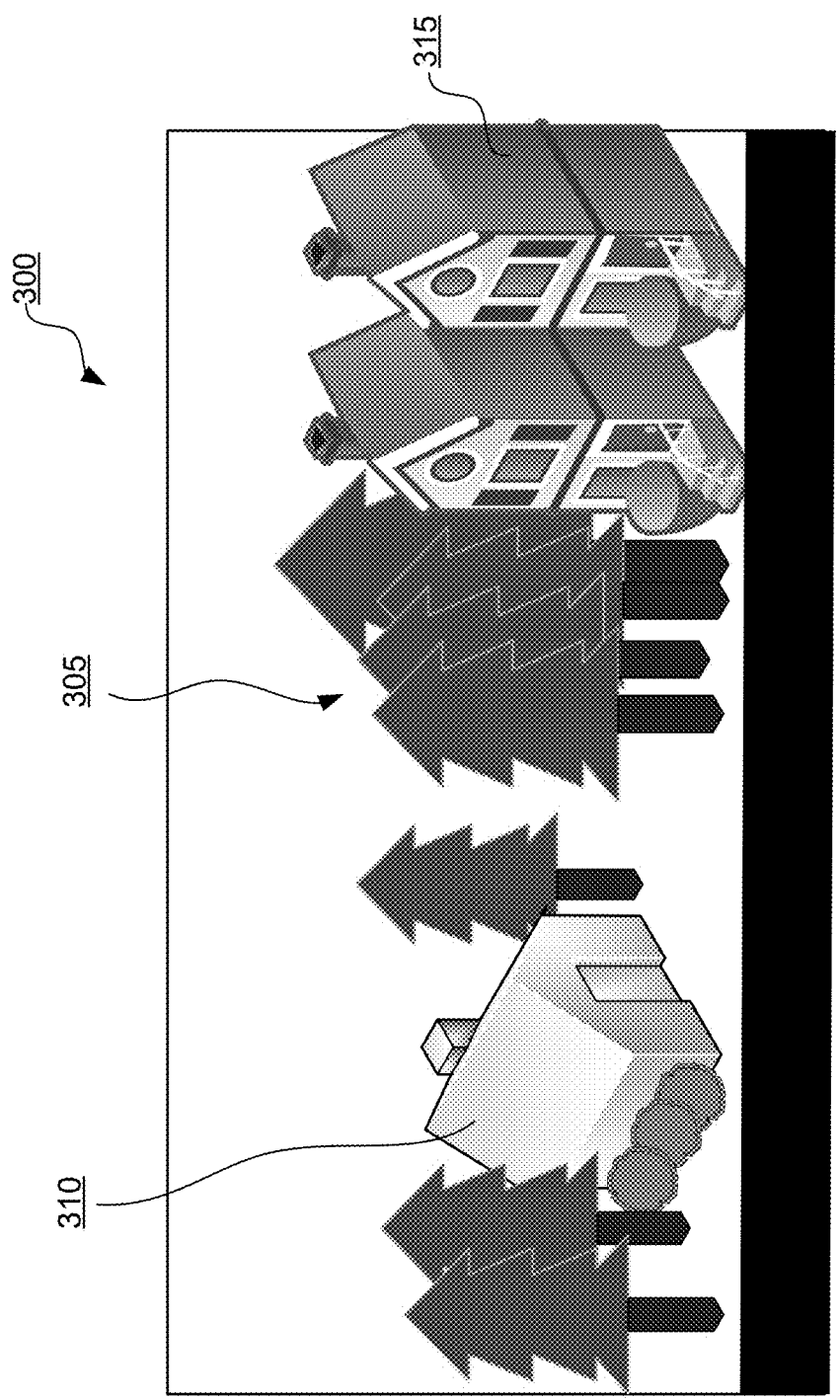
FIG. 3 shows a graphical user interface depicting a zoomed out, three dimensional satellite view from the perspective of a virtual camera in a map application according to some embodiments of the present invention.
Figure 4:
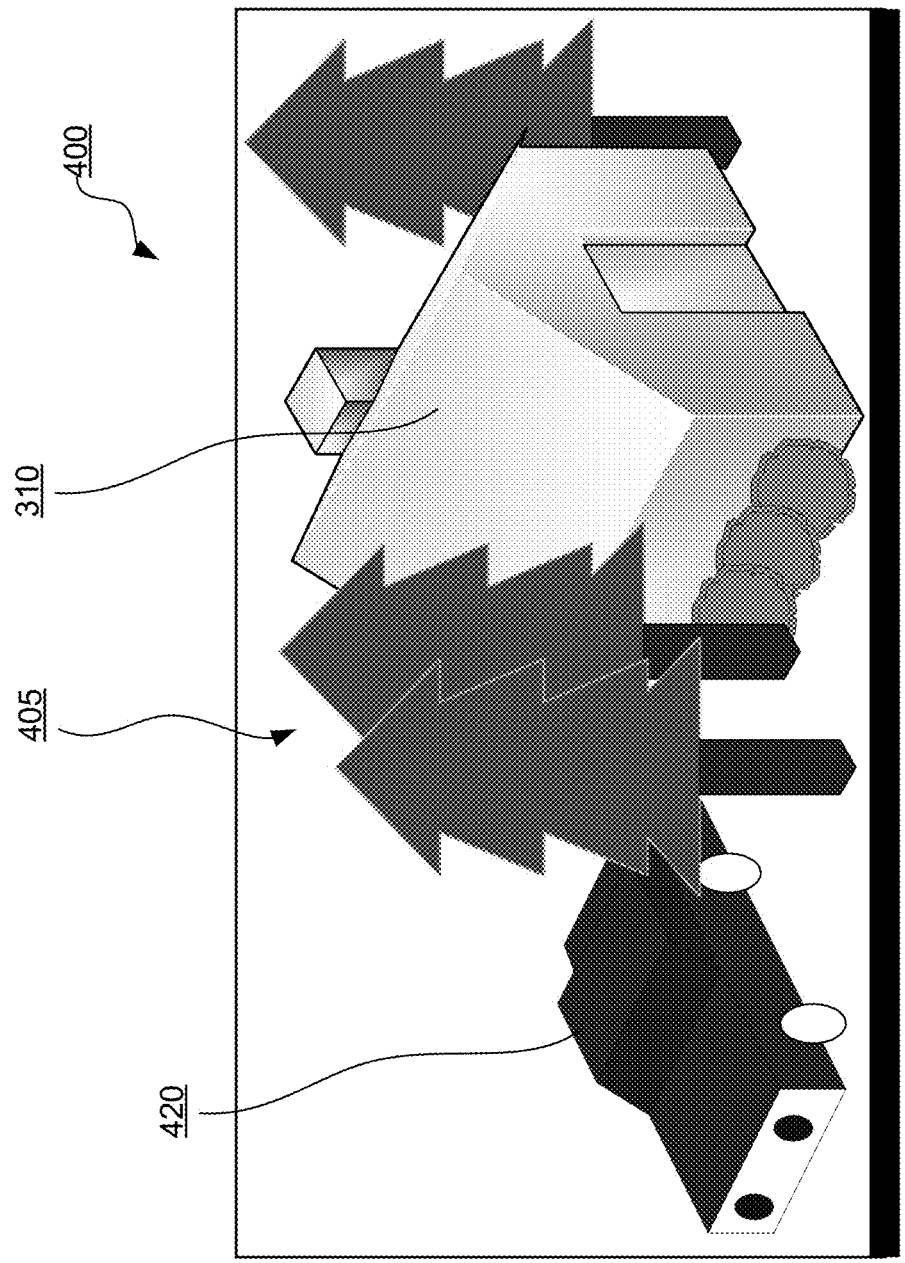
FIG. 4 shows a display of a mobile device depicting a zoomed out view from the perspective of a physical camera of the mobile device according to some embodiments of the present invention.

Although shown and described as registering objects with the physical camera indoors with respect to FIGS. 2A-C, in some embodiments, objects may be registered with the physical camera outdoors. When outdoors, the physical camera of the mobile device may be used to capture images of a physical environment within which the mobile device resides (i.e., the environment positioned in front of and around the physical camera). FIGS. 3 and 4 show images taken by a camera, which may be used to control a position of a virtual camera for rendering map objects of a map.

FIG. 3 shows an image 300 captured by a mobile device depicting an initial view from the perspective of a physical camera according to some embodiments of the present invention. The position of the camera that provides the image shown in FIG. 3 may be defined as an origin position of the physical camera. The image 300 shown in FIG. 3 may result in a map image being rendered based on an initial position of a virtual camera. In various embodiments, the initial position of the virtual camera be set as a default or be determined based on the initial position of the mobile device. For example, the virtual camera can be oriented at an angle of 10 degrees (relative to a normal to the ground) based on the physical camera of the mobile device also being oriented at an angle of 10 degrees.

Movement of the physical camera from the initial position used to obtain image 300 shown in FIG. 3 may result in a corresponding movement of the virtual camera from the initial position. For example, FIG. 4 shows an image 400 captured by the mobile device depicting a zoomed in view from the perspective of the physical camera of the mobile device according to some embodiments of the present invention. The perspective of the physical camera of FIG. 4 has been shifted with respect to FIG. 3, thereby signifying a different position of the physical camera. Specifically, the physical camera of FIG. 4 has been zoomed in and shifted to the left relative to the physical objects. This movement of the physical camera may be caused by a user moving the mobile device forward (e.g., away from the body or just walking forward) and to the left, to a new physical position. The new physical position may be used to determine the new virtual position of the virtual camera to render a new view from the perspective of the virtual camera. This determination may be made based on changes in the images between FIGS. 3 and 4.

Specifically, movement of the mobile device from the initial position used to obtain image 300 of FIG. 3 may be detected by comparing the image 400 from the physical camera of FIG. 4 to the image 300. A current physical position of the physical camera with respect to the initial position may be determined based on the image 400 of FIG. 4. For example, the image 300 may be compared to the image 400 to determine how and to what degree the physical camera has moved. In the example of FIG. 3, image 300 shows a group 305 of four trees straight ahead with a house 310 to the left and townhomes 315 to the right. A second image 400 (e.g., as illustrated in FIG. 4) may show a group 405 of two trees straight ahead with the house 310 zoomed in to the right and a car 420 to the left. These images may be analyzed to determine that the physical camera has shifted to the left and zoomed in with respect to the origin position. The amount of movement of the physical camera may also be estimated, e.g., 10 feet to the left.

In some embodiments, sensor measurements taken by the mobile device and/or images taken by the physical camera can be used to determine a movement vector relative to the initial position of the mobile device. The initial position itself can be defined at a position relative to an origin, and the current position of the mobile device can be composed of these two vectors.

C. Map Interface

Figure 5:
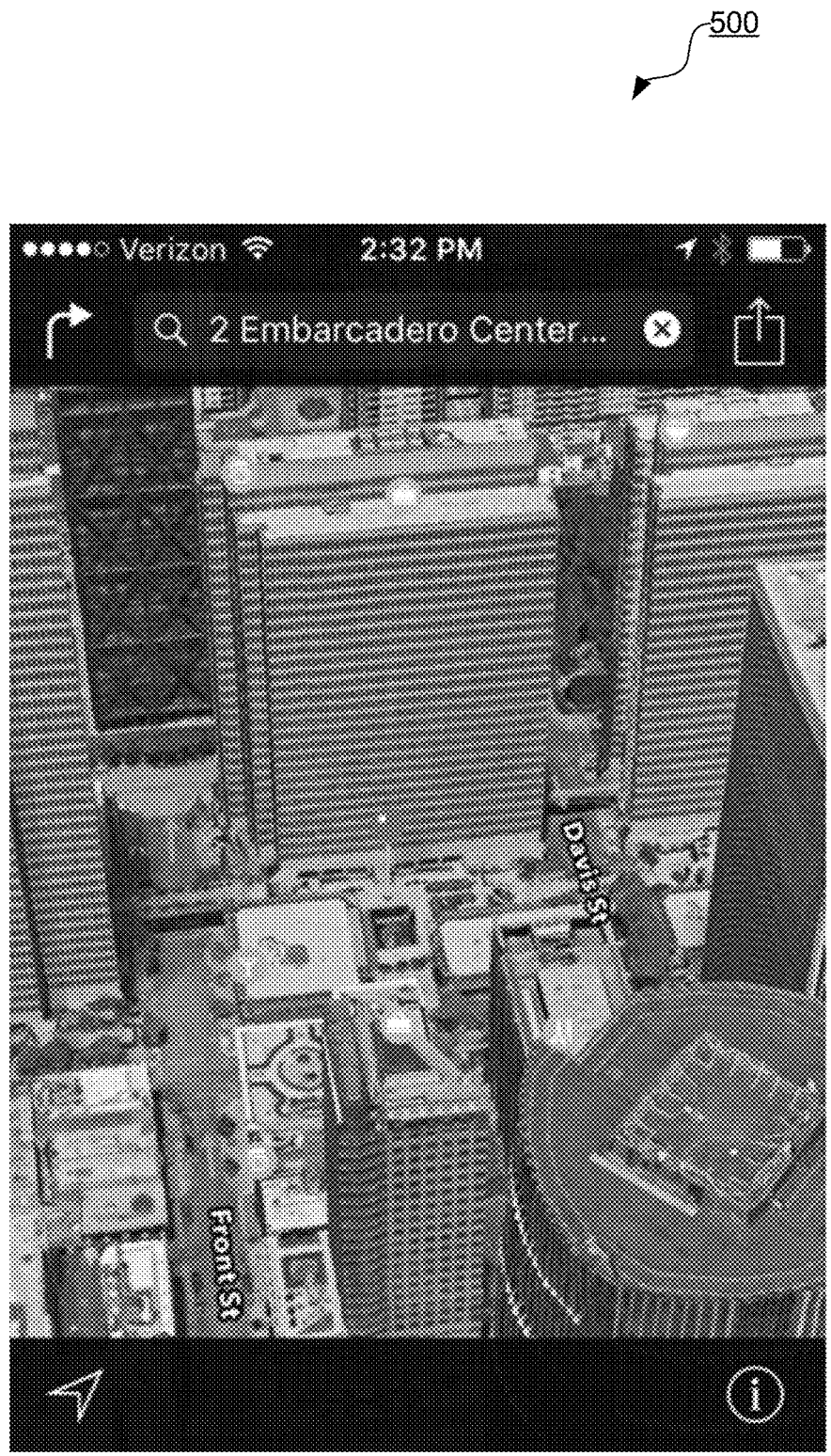
FIG. 5 shows a display depicting a zoomed in, three dimensional satellite view from the perspective of a virtual camera in a map application according to some embodiments of the present invention. The perspective of the virtual camera of FIG. 5 has been shifted with respect to FIG. 3.

The initial three dimensional view of a map from the perspective of the virtual camera may be displayed in response to a location being detected or an address being entered. FIG. 5 shows a graphical user interface depicting a zoomed out, three dimensional satellite map view 500 from the perspective of a virtual camera (e.g., virtual camera 216) in a map application according to some embodiments of the present invention. As shown in FIG. 5, an address has been entered into the map application (e.g., "2 Embarcadero Center, San Francisco, Calif."). The map application may retrieve and display map data including the entered address.

In this example, the map application may display the map data in a three dimensional satellite (e.g., overhead) view. The map application may further drop a pin or other indicator at the entered address. The map data may include roads, road names, cities, city names, neighborhoods, landmarks, parks, businesses, public transportation, and/or the like (e.g., map objects such as building 215, tree 220, and bank 225 of FIGS. 2A-C). In some embodiments, the three dimensional satellite view of FIG. 5 may be displayed in response to a user selection of a three dimensional satellite view from the graphical user interface.

The map view 500 can correspond to the initial position of a virtual camera, e.g., initial position 216 of FIG. 2C or initial position as defined by image 300 of FIG. 3. The physical camera can have a corresponding initial position from which movement is compared. Movement from this initial position of the mobile device as captured by the physical camera and/or sensors may result in corresponding movement in the displayed map.

Figure 6:
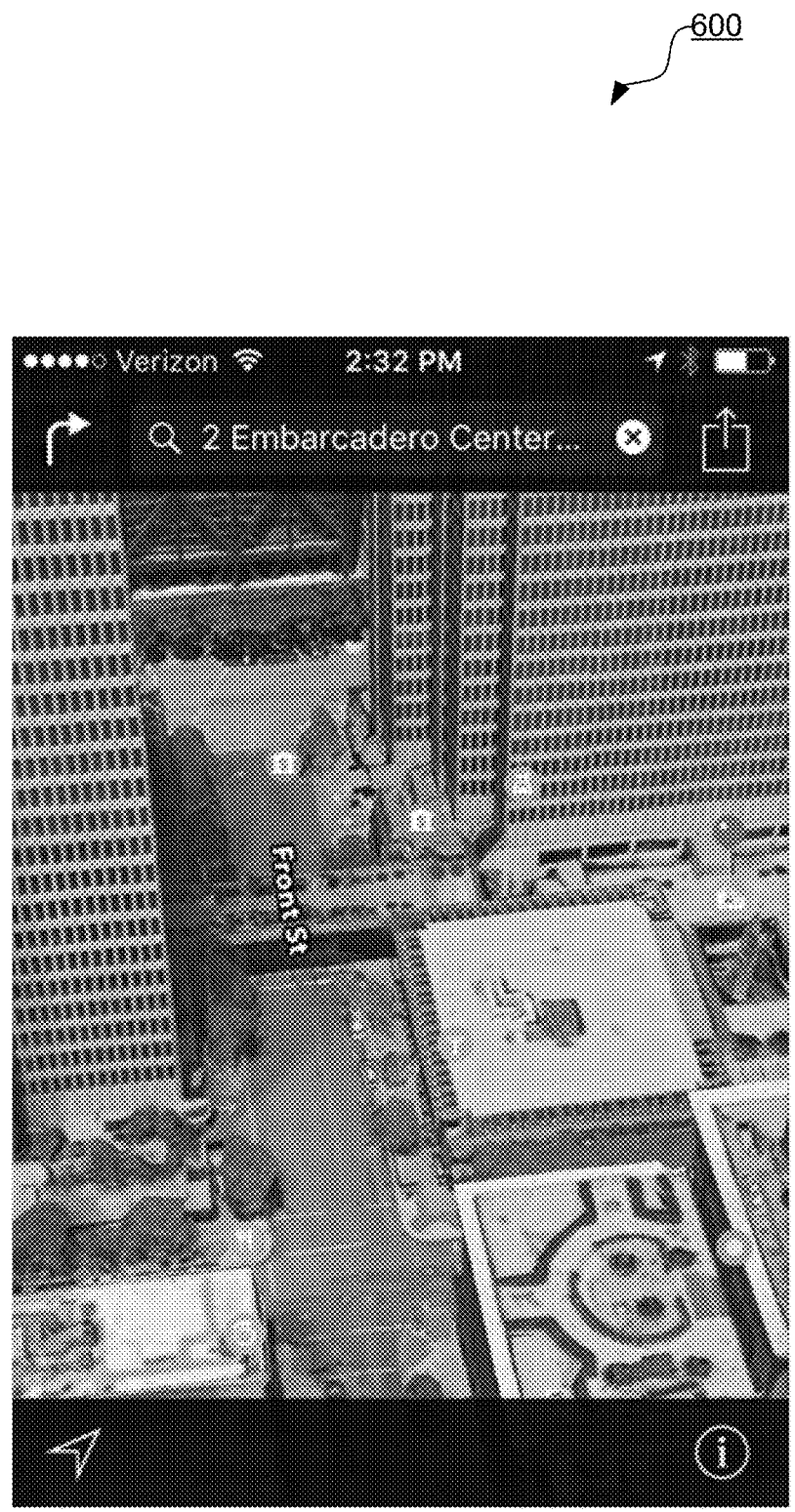
FIG. 6 shows a graphical user interface on a display of a mobile device depicting a zoomed in view from the perspective of a physical camera of the mobile device according to some embodiments of the present invention. The perspective of the physical camera of FIG. 6 has been shifted with respect to FIG. 4.

FIG. 6 shows a graphical user interface depicting a zoomed in, three-dimensional satellite map view 600 from the perspective of a virtual camera (e.g., the virtual camera at position 217 of FIG. 2C) in a map application according to some embodiments of the present invention. The perspective of the virtual camera of FIG. 6 has been shifted with respect to FIG. 5. Specifically, the virtual camera of FIG. 6 has been zoomed in and shifted to the left. As an example, such movement can correspond to a user taking a step to the left and a step forward. In this manner, the user can control which map objects are displayed on a screen of the mobile device, as well as how they are displayed (e.g., what zoom level or what virtual camera angle is used).

IV. System

Figure 7:
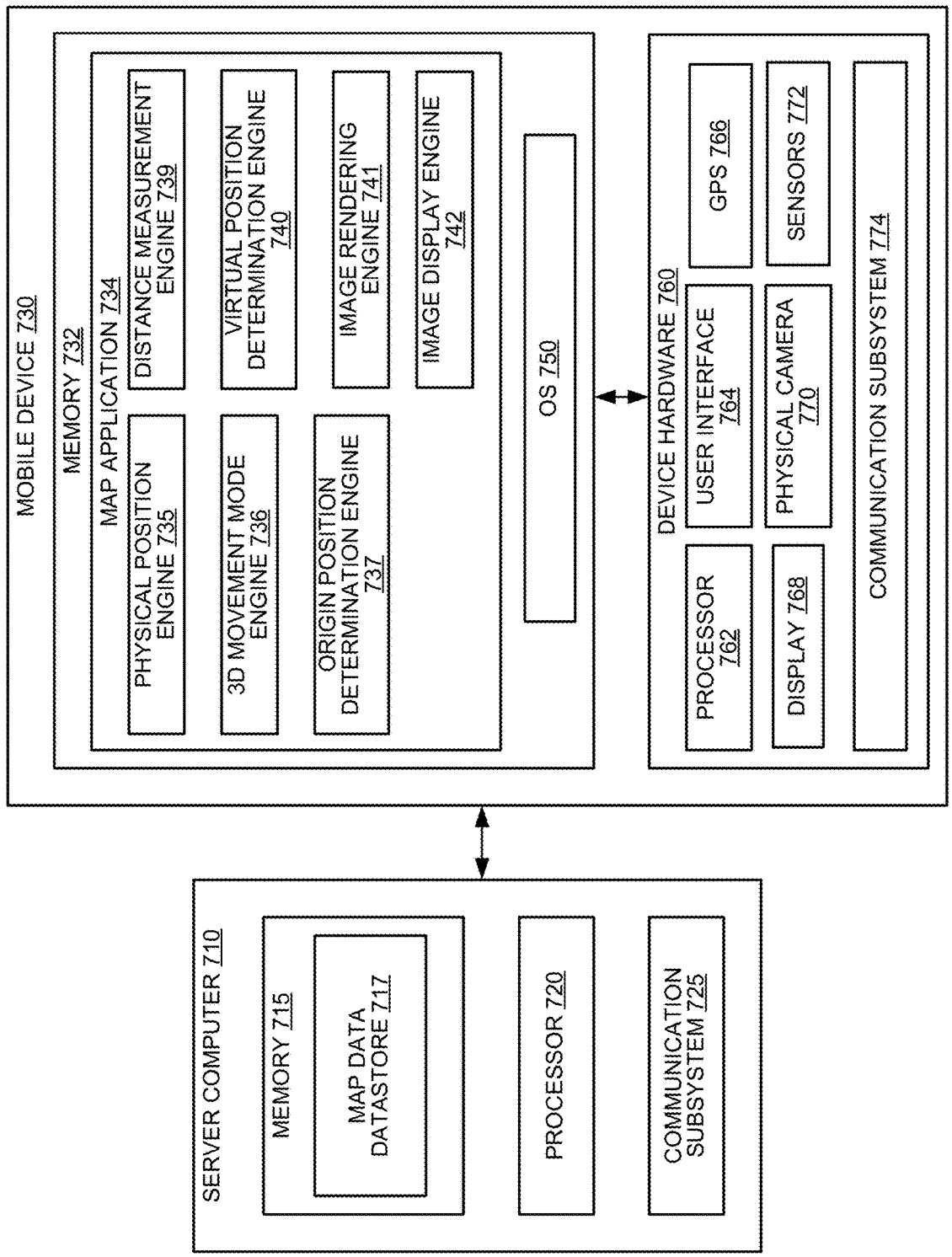
FIG. 7 shows a block diagram depicting a system for implementing an augmented reality map application on a mobile device according to some embodiments of the present invention.

FIG. 7 shows a block diagram depicting a system for implementing an augmented reality map application on a mobile device according to some embodiments of the present invention. The system may implement "augmented reality" in that the mobile device is moved in the real world to manipulate a virtual map, and data does not necessarily need to be overlaid onto real world images. The system may be used to create the graphical user interfaces shown in FIGS. 3, 4, 5 and 6. The system may include a server computer 710 and a mobile device 730. The server computer 710 and the mobile device 730 may be in operative communication with each other, such as over one or more networks. The mobile device 730 may be a mobile device 100, as described with respect to FIG. 1.

The server computer 710 may include a memory 715, a processor 720, and a communication subsystem 725. The communication subsystem 725 may enable the server computer 710 to communicate with the mobile device 730. The memory may include a map data datastore 717. The map data datastore 717 may store map data for a plurality of locations. For example, the map data datastore 717 may store road maps for a number of regions (e.g., states, countries, etc.). The map data may include features, such as roads, buildings, businesses, parks, landmarks, houses, trails, and the like. The map data may include maps in any number of formats (e.g., two dimensional, three dimensional, map view, satellite view, top down view, eye level view, etc.). The map data may be stored along with its associated location(s) in any suitable manner. For example, the map data may be stored in association with addresses, coordinates, names, and/or any other indicator.

The server computer 710 may be in communication with a mobile device 730. The mobile device 730 may include a memory 732 and device hardware 760. The device hardware 760 may include a processor 762, a user interface 764, a global positioning system (GPS) 766, a display 768, a physical camera 770, sensors 772, and a communication subsystem 774. In some embodiments, the display 768 forms part of the user interface 764. The user interface 764 may further include input elements, such as a keyboard, a trackball, a trackpad, a mouse, a microphone, etc. The communication subsystem 774 may include hardware components configured to allow the mobile device 730 to communicate with the server computer 710, such as over a network.

The memory 732 may include an operating system (OS) 750. The operating system 750 may provide an interface for a user to use the mobile device 730, e.g., to operate device hardware 760 and to execute map application 734. The map application 734 may include a plurality of engines for facilitating the map functions of the mobile device 730. For example, the map application 734 may include a physical position engine 735, a three-dimensional movement mode engine 736, an origin position determination engine 737, a movement detection engine 738, a distance measurement engine 739, a virtual position determination engine 740, an image rendering engine 741, and an image display engine 742. Although shown and described as having a certain number of separate engines, it is contemplated that the map application 734 may include a greater or fewer number of engines, and/or that the functions of multiple engines described herein may be combined.

The physical position engine 735 may, in conjunction with the processor 762, request a current physical position and orientation of the mobile device 730 from the GPS 766 and/or one or more sensors 772 (e.g., a compass, a gyroscope, etc.) in some embodiments. In response to the request, the GPS 766 may generate a set of coordinates (e.g., GPS coordinates, latitude and longitude coordinates, etc.) indicative of the current location of the mobile device 730, and provide those coordinates to the physical position engine 735. Similarly, the sensors may generate orientation data of the mobile device 730, and provide the orientation data to the physical position engine 735 (e.g., a cardinal direction). The physical position engine 735 may, in conjunction with the processor 762 and the communication subsystem 774, transmit the coordinates and the orientation data to the server computer 710. The server computer 710 may, in conjunction with the processor 720, query the map data datastore 717 with the coordinates and the orientation data to retrieve map data corresponding to the coordinates from the perspective of the orientation included in the orientation data, and transmit the map data back to the mobile device 730 via the communication subsystem 725.

In some embodiments, the physical position engine 735 may receive input corresponding to a physical position via means other than the GPS 766. For example, the physical position engine 735 may receive an indicator of a location (e.g., an address, coordinates, a business name, etc.) via user interface 764, which may include a physical or virtual keyboard in some embodiments. The physical position engine 735 may then, in conjunction with the processor 762 and the communication subsystem 770, transmit the indicator to the server computer 710. The server computer 710 may, in conjunction with the processor 720, query the map data datastore 717 with the indicator to retrieve map data corresponding to the indicator, and transmit the map data back to the mobile device 730 via the communication subsystem 725.

Although shown and described as being stored in the map data datastore 717, it is contemplated that in some embodiments, certain map data may be cached and stored locally on the mobile device 730. For example, frequently used map data (e.g., map data including a home or work location) may be stored in the memory 732, and thus may not need to be requested from the server computer 710. This may reduce data consumption by the mobile device 730 and decrease processing time needed to display frequently used map data.

A. Registration

Once the map data has been retrieved (either locally or from the server computer 710), a map view displaying the map data may be displayed on the display 768. The map view may include a set of map objects corresponding to a location within a map from an initial virtual position of a virtual camera. The virtual camera may have an initial virtual position of being overhead of the entered address. Exemplary map objects may include features (e.g., roads, buildings, monuments, parks, landmarks, etc.) at or around the entered location.

From the map view, the user may interact with the user interface 764 to select a three-dimensional movement mode that uses the physical camera 770. For example, a user may select a button on the user interface corresponding to the three-dimensional movement mode. In another example, the three-dimensional movement mode may be automatically activated upon a user's selection of a three-dimensional map or satellite view. Selection of the three-dimensional mode may activate the three-dimensional movement mode engine 736. The three-dimensional movement mode engine 736 may, in conjunction with the processor 762, activate the physical camera 770. The three-dimensional movement mode engine 736 may capture one or more first images of a physical environment within which the mobile device 730 resides using the physical camera 770. In other words, once activated, the physical camera 770 may capture an image of the environment positioned in front of and around the physical camera 770. This image may be provided to the origin position determination engine 737.

The origin position determination engine 737 may, in conjunction with the processor 762, determine an origin (i.e., initial) position of the physical camera in the physical environment using the one or more first images. For example, the origin position determination engine 737 may analyze the images captured by the physical camera 770 to determine that the physical camera 770 is positioned directly in front of a tree with a blue house to the left of the tree and a red house to the right of the tree. The origin position determination engine 737 may register the physical positions of these objects. In some embodiments, the origin position corresponds to a physical position of the physical camera 770 when the user input is received activating the three-dimensional movement mode. In some embodiments, the origin position may default automatically at the center of the map. This origin position may be used to thereafter determine physical movement of the mobile device after activation of the three-dimensional movement mode, as described further herein.

The origin position determination engine 737 may further, in conjunction with the processor 762, specify a set of physical positions of a set of three dimensional objects of the map relative to the origin position. The set of three dimensional objects may correspond to the set of map objects. For example, the building indicated by the pin at "2 Embarcadero Center" of FIG. 3 may be a map object corresponding to the three dimensional building indicated by the pin at "2 Embarcadero Center" in FIG. 3. The physical position of the three dimensional building indicated by the pin in FIG. 3 relative to the origin position may be straight ahead (e.g., corresponding to the tree in the above example). The physical position of the building to the left of the pin relative to the origin position may be ahead and to the left (e.g., corresponding to the blue house in the above example). The physical position of the building to the right of the pin relative to the origin position may be head and to the right (e.g., corresponding to the red house in the above example).

In some embodiments, the set of physical positions of the set of three dimensional objects are specified at default positions and/or orientations with respect to the mobile device 730. For example, the default positions may be dependent on the tilt angle of the mobile device 730. In some embodiments, if the physical camera 770 is at an angle greater than 45 degrees from face down (e.g., face up), the default positions may be at a lesser default tilt angle (e.g., 15 degrees). This may be beneficial in that it does not allow impractical or non-useful views of objects to be rendered (e.g., views of the sky). Similarly, the default positions may include default heights and/or distances from the ground or other map objects. In some embodiments, the set of physical positions of the set of three dimensional objects are specified based on angular coordinates of the mobile device 730. These physical positions may be used to render views of the three dimensional objects, as described further herein.

B. Distance Measurement

The distance measurement engine 739 may, in conjunction with the processor 762, detect movement of the physical camera 770 from the origin position. This movement may be detected using any suitable method. In some embodiments, this movement may be detected using one or more sensors 772. The sensors may include, for example, a gyroscope, an accelerometer, a compass, and/or the like. For example, a gyroscope may indicate angular rotation of the mobile device 730 downward. In another example, an accelerometer may indicate movement of the mobile device forward. In still another example, a compass may indicate movement of the mobile device from a north-facing position to a northeast-facing position. In still another example, a GPS 766 may indicate movement of the mobile device 730 from an initial position to a new position. In some embodiments, the movement detected by the sensors 772 alone may be sufficient to determine the new physical position of the mobile device 730, and thus the new virtual position of the virtual camera. For example, the mobile device 730 may include an orientation sensor. An angular change between the origin position of the physical camera 770 and the current physical position of the physical camera 770 may be determined using the orientation sensor. The angular change may be used to determine the updated virtual position, thereby rotating the virtual camera.

In some embodiments, movement of the mobile device 730 from the origin position may alternatively or additionally be detected by comparing subsequently captured images from the physical camera 770 to the images taken at the origin position. In these embodiments, the distance measurement engine 739 may, in conjunction with the processor 762, capture one or more second images of the physical environment within which the mobile device resides using the physical camera 770. The distance measurement engine 739 may capture the second images after movement of the mobile device 730.

The distance measurement engine 739 may determine a current physical position of the physical camera 770 with respect to the origin position based on the one or more second images. For example, the distance measurement engine 739 may compare the first images to the second images to determine how and to what degree the physical camera 770 has moved. For example, a first image (e.g., as illustrated in FIG. 4) may show a group of five trees straight ahead with a beige house to the left and brown townhomes to the right. A second image (e.g., as illustrated in FIG. 6) may show a group of two trees straight ahead with the beige house zoomed in to the right and a red car to the left. The distance measurement engine 739 may analyze these images to determine that the physical camera 770 has shifted to the left and zoomed in with respect to the origin position. The distance measurement engine 739 may further estimate the amount of movement of the physical camera 770, e.g., 10 feet to the left. In some embodiments, the current physical position of the physical camera 770 is specified as a six-dimension coordinate of translation coordinates and angular coordinates.

As an example, the sensor measurements and/or images taken by the physical camera 770 can be used to determine a movement vector relative to the initial position of the mobile device 730. The initial position itself can be defined at a position relative to an origin, and the current position of the mobile device 730 can be composed of these two vectors.

The sensors can be used to determine movement. For example, it can be estimated that the mobile device 730 has moved 30 centimeters based on an accelerometer reading. The 30 centimeters can define a sphere around which the mobile device 730 could have moved. If the accelerometer is a three-dimensional accelerometer, the direction of movement can be determined, thereby providing an estimate for the relative movement vector. The images can be analyzed to refine the position. For example, the new distance (e.g., pixels on the image) between objects can be analyzed and compared to the pixel distance for the initial image. The pixel distance can be translated to an actual distance based on camera parameters, e.g., zoom setting and depth of field analysis. The accelerometer position and the image position can be used to determine the current movement vector, e.g., by taking an average. In other embodiments, the image position can use the accelerometer position as an input, so the image analysis can start with an approximate value. In some embodiments, the image position can use a gyroscope or compass reading as input, so the image analysis can start with an approximate angular or directional orientation.

C. Map Rendering at New Position

The virtual position determination engine 740 may, in conjunction with the processor 762, determine an updated virtual position and orientation of the virtual camera based on the current physical position and orientation of the physical camera. The first and second images taken by the physical camera 770 can be used to determine a movement vector relative to the initial position of the mobile device 730. The initial position itself can be defined at a position relative to an origin, and the current position of the mobile device 730 can be composed of these two vectors. The current position may then be used to determine an updated virtual position. For example, the virtual position determination engine 740 may determine that the virtual camera should be shifted right and pointed downward based on the movement of the physical camera 770 to the right and its angular movement downward. In some embodiments, the virtual position determination engine 740 may scale the estimated amount of movement of physical camera 770 to a different amount of movement of the virtual camera. For example, every inch of movement of the physical camera 770 may be scaled to 10 feet of movement of the virtual camera.

The image rendering engine 741 may, in conjunction with the processor 762, render an image of the set of three dimensional objects based on the updated virtual position of the virtual camera. In the above example of FIGS. 4 and 6, the image rendering engine 741 may render an image centered on the building to the left of the pin (e.g., corresponding to the group of two trees), with the building indicated by the pin to the right (e.g., corresponding to the beige house), and another building to the let (e.g., corresponding to the red car), as shown in FIG. 5.

The image rendering engine 741 may provide the rendered image to the image display engine 742. The image display engine 742 may, in conjunction with the processor 762, display the rendered image on the display 768.

D. Map Overlay on Camera Images

In some embodiments, the image display engine 742 may overlay the rendered map image on the second images (or any subsequent images captured in real time by the physical camera 770). In some embodiments, the image display engine 742 may, in conjunction with the processor 762, identify a surface in the real time images captured by the physical camera 770. For example, the image display engine 742 may identify a horizontal surface (or other suitable flat surface) present in the images, such as a table, a shelf, or a floor. The image display engine 742 may overlay the rendered map image (e.g., a three-dimensional view of buildings, streets and/or other features) on the identified surface in the camera images. For example, buildings may be rendered onto the top surface of an image of a desk such that the base of the buildings appear to be positioned on the desk with the buildings protruding from the desk. The mobile device 730 may then be moved around the desk, still pointed at the desk, and the map image may be continuously rendered to reflect the changes in position and orientation, such that the map image appears to be a three-dimensional model on the desk.

V. Method of Using Movement Interface for Viewing 3D Map

Figure 8:
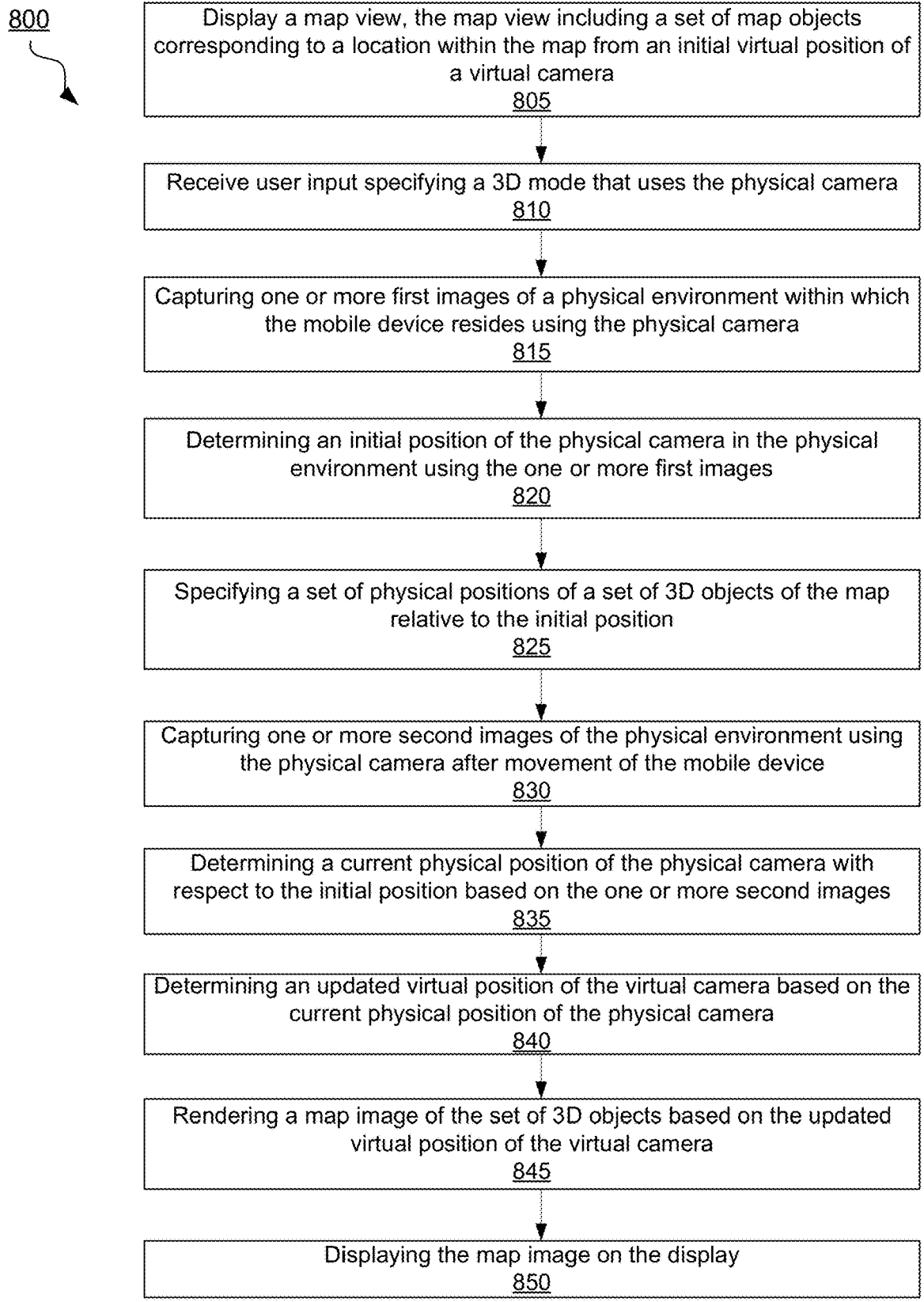
FIG. 8 shows a flow chart depicting a method for implementing an augmented reality map application on a mobile device according to some embodiments of the present invention.

FIG. 8 shows a flow chart 800 depicting a method for providing an augmented view of a map on a display of a mobile device according to some embodiments of the present invention. The method described with respect to FIG. 8 may be implemented by a mobile device having a physical camera communicably coupled with the display. For example, the method described with respect to FIG. 8 may be implemented by mobile device 730 of FIG. 7 having a physical camera 770 coupled with a display 768.

At step 805, a map view map be displayed. The map view may include a set of map objects corresponding to a location within the map from an initial virtual position of a virtual camera. The map objects may include, for example, roads, buildings, businesses parks, landmarks, houses, trails, and/or the like. The map view may be in any of a number of different formats (e.g., two-dimensional, three-dimensional, etc.). The virtual camera may have an initial virtual position of being overhead of an entered address or a GPS-determined location. The virtual camera may be, for example, virtual camera 216 of FIG. 2C. The map view may display, for example, image 500 of FIG. 5.

At step 810, user input is received specifying a three-dimensional mode that uses the physical camera. The user input may be received via one or more input elements, such as a touchscreen display, a keyboard, a trackball, a trackpad, a mouse, a microphone, etc. For example, the user may select a button on the display corresponding to the three-dimensional mode. The user input may also include a gesture, such as a movement of the mobile device as sensed by one or more sensors (e.g., accelerometers, gyroscopes, compasses, etc.). In some embodiments, the three-dimensional mode may not use the physical camera, but just use the one or more sensors.

At step 815, in response to the user input, one or more first images of a physical environment within which the mobile device resides may be captured using the physical camera. For example, the physical camera may capture an environment positioned in front of and around the physical camera.

At step 820, an initial position of the physical camera in the physical environment is determined using the one or more first images. The initial position of the physical camera can be defined relative to an origin position in the physical environment. In some embodiments, the origin position may correspond to the initial position of the physical camera when the user input is received at step 810. Thus, the origin position can be taken as the initial position of the mobile device 205 in FIG. 2A. As another example, the origin position can be the center of the map objects (e.g., tree 220).

At step 825, a set of physical positions of a set of three-dimensional objects of the map relative to the initial position of the physical camera are specified. The set of three-dimensional objects may correspond to the set of map objects. In some embodiments, the set of physical positions of the set of three-dimensional objects may be specified at default positions from the mobile device. The three-dimensional objects may include, for example, building 215, tree 220, and/or ban 225 of FIGS. 2A-2C. The determination of the physical positions of the 3D objects relative to the initial position of the physical camera can be defined with respect to an origin position, which may or may not be the initial position.

At step 830, one or more second images of the physical environment within which the mobile device resides may be captured using the physical camera after movement of the mobile device. In some embodiments, the one or more first images may be compared to the one or more second images to determine a movement vector relative to the origin position of the physical camera. The movement vector may be, for example, movement vector 209 of FIG. 2B.

At step 835, a current physical position of the physical camera may be determined with respect to the origin position based on the one or more second images. In some embodiments, the current physical position of the physical camera may be determined based on one or more measurements from one or more sensors of the mobile device. The sensors may be used in addition to the images or as an alternative to the images. The sensors may include, for example, an accelerometer, a gyroscope, a compass, combinations thereof, and/or the like. In some embodiments, an angular change between the origin position of the physical camera and the current physical position of the physical camera may be determined using an orientation sensor of the mobile device.

At step 840, an updated virtual position of the virtual camera may be determined based on the current physical position of the physical camera. The virtual camera may be, for example, virtual camera 217 of FIG. 2C. In some embodiments, the updated virtual position of the virtual camera may be determined by applying a movement vector to the initial virtual position of the virtual camera. In some embodiments, the movement vector may be scaled before applying the movement vector to the initial virtual position of the virtual camera.

At step 845, a map image (e.g., image 600 of FIG. 6) may be rendered of the set of three-dimensional objects based on the updated virtual position of the virtual camera. The rendering can receive the coordinates of the virtual camera and the coordinates of the three-dimensional objects, as well as any texture, color, or other visual information of the three-dimensional objects.

At step 850, the map image may be displayed on the display. In some embodiments, the map image may be overlaid onto the one or more second images obtained from the physical camera. In some embodiments, the map image may be overlaid onto subsequent images obtained from the physical camera in real time.

VI. Example Device

Figure 9:
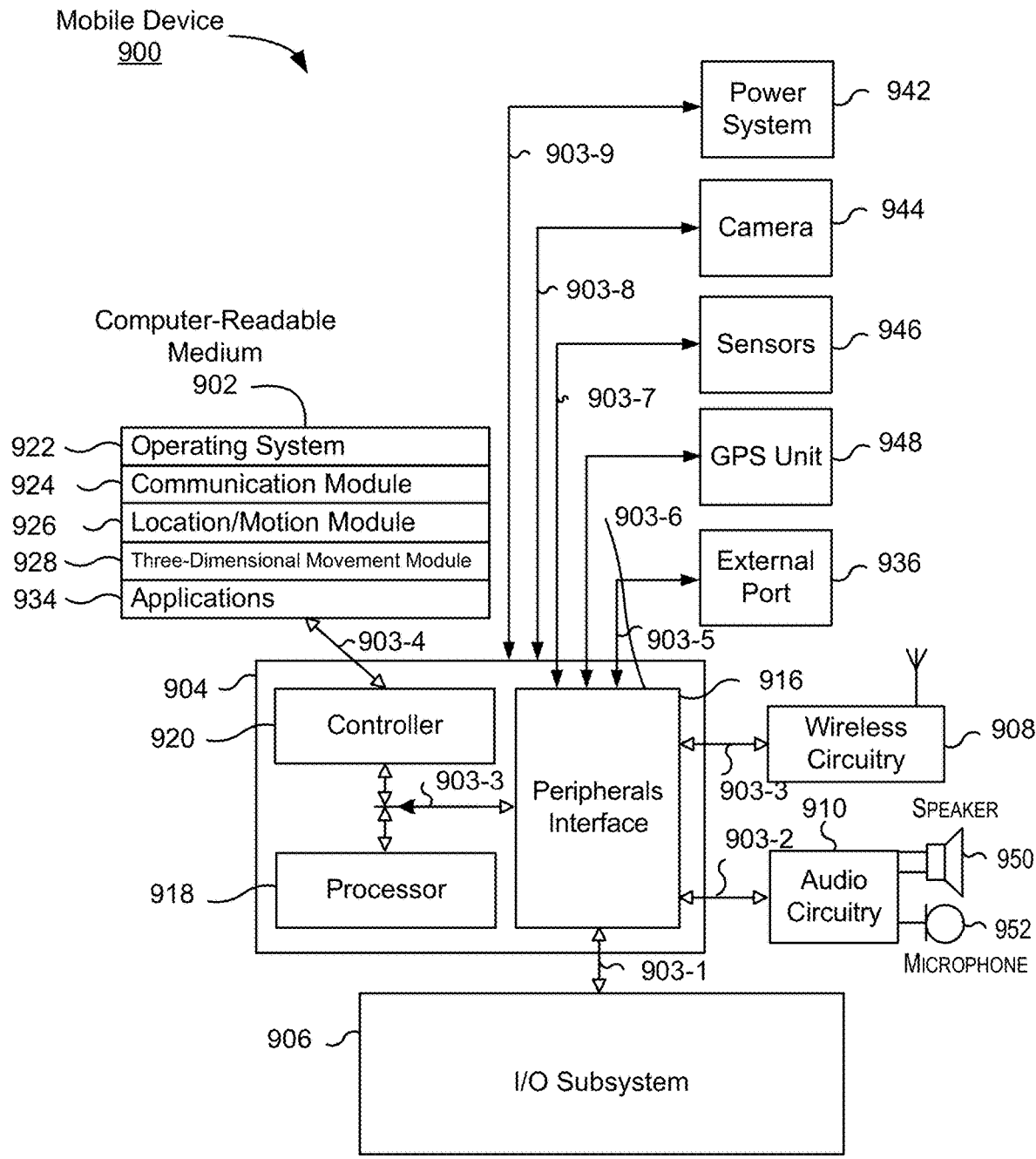
FIG. 9 shows a block diagram of an example device, which may be a mobile device, according to some embodiments of the present invention.

FIG. 9 is a block diagram of an example device 900, which may be a mobile device as described herein. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a car display unit, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944 (e.g., a physical camera). In some embodiments, device 900 includes sensors 946. Sensors 946 can include accelerometers, compasses, gyroscopes, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, an three dimensional module 928 that implements a three-dimensional movement mode as described herein, and other applications (or set of instructions) 934.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifiers) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

The three dimensional module 928 can activate automatically or in response to user input, such as a gesture, movement, and/or selection on a user interface. Once activated, the three dimensional module 928 may capture image data using the camera 944. The three dimensional module 928 can determine whether the mobile device 900 has been moved and move a virtual camera showing a map, as described further herein.

The one or more applications programs 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" element does not necessarily require that a second element be provided. Moreover reference to a "first" or a "second" element does not limit the referenced element to a particular location unless expressly stated.

All patents, patent applications, publications, and descriptions mentioned herein are incorporated by reference in their entirety for all purposes. None is admitted to be prior art.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

What is claimed is:

1. A mobile device comprising:
   a display;
   a physical camera communicably coupled with the display;
   a processor; and
   a memory coupled to the processor, the memory storing instructions, which when executed by the processor, cause the mobile device to perform operations including:
   displaying a map view on the display, the map view including a set of map objects corresponding to a location within a map from an initial virtual position of a virtual camera;
   receiving user input specifying an interactive mode that uses the physical camera;
   in response to the user input, capturing one or more first images of a physical environment within which the mobile device resides using the physical camera;
   determining an initial position that corresponds to a physical location of the physical camera in the physical environment using the one or more first images;
   specifying a set of physical positions of a set of objects of the map relative to the initial position of the physical camera, the set of objects corresponding to the set of map objects;
   displaying a first virtual map image on the display, the first virtual map image being overlaid on the one or more first images;
   capturing one or more second images of the physical environment within which the mobile device resides using the physical camera after movement of the mobile device;
   determining a current physical position of the physical camera with respect to the initial position based on the one or more second images;
   determining an updated virtual position of the virtual camera based on the current physical position of the physical camera;
   rendering a second virtual map image of the set of objects based on the updated virtual position of the virtual camera; and
   displaying the second virtual map image on the display, the second virtual map image being overlaid on the one or more second images.

2. The mobile device of claim 1, further comprising:
   one or more sensors, wherein the current physical position of the physical camera is further determined based on one or more measurements from the one or more sensors.

3. The mobile device of claim 2, wherein the one or more sensors include at least one of: an accelerometer, a gyroscope, and a compass.

4. The mobile device of claim 1, wherein the initial position corresponds to a physical position of the physical camera when the user input is received.

5. The mobile device of claim 1, wherein the set of physical positions of the set of objects are specified at default positions from the mobile device.

6. The mobile device of claim 5, wherein the default positions comprise a default orientation with respect to the mobile device.

7. The mobile device of claim 1, further comprising:
   an orientation sensor, and wherein the operations further include:
   determining an angular change between the initial position of the physical camera and the current physical position of the physical camera using the orientation sensor;
   using the angular change to determine the updated virtual position, thereby rotating the virtual camera.

8. The mobile device of claim 1, wherein the operations further include:
   comparing the one or more first images to the one or more second images to determine a movement vector relative to the initial position of the physical camera,
   wherein determining the updated virtual position of the virtual camera based on the current physical position of the physical camera includes:
   applying the movement vector to the initial virtual position of the virtual camera.

9. The mobile device of claim 8, wherein determining the updated virtual position of the virtual camera based on the current physical position of the physical camera further includes:
   scaling the movement vector before applying the movement vector to the initial virtual position of the virtual camera.

10. A method of providing a view of a map on a display of a mobile device, the method comprising performing, by the mobile device having a physical camera communicably coupled with the display:
    displaying a map view on the display, the map view including a set of map objects corresponding to a location within the map from an initial virtual position of a virtual camera;

receiving user input specifying an interactive mode that uses the physical camera;

in response to the user input, capturing one or more first images of a physical environment within which the mobile device resides using the physical camera;

determining an initial position that corresponds to a physical location of the physical camera in the physical environment using the one or more first images;

specifying a set of physical positions of a set of objects of the map relative to the initial position, the set of objects corresponding to the set of map objects;

displaying a first virtual map image on the display, the first virtual map image being overlaid on the one or more first images;

capturing one or more second images of the physical environment within which the mobile device resides using the physical camera after movement of the mobile device;

determining a current physical position of the physical camera with respect to the initial position based on the one or more second images;

determining an updated virtual position of the virtual camera based on the current physical position of the physical camera;

rendering a second virtual map image of the set of objects based on the updated virtual position of the virtual camera; and displaying the second virtual map image on the display, the second virtual map image being overlaid on the one or more second images.

11. The method of claim 10, wherein the current physical position of the physical camera is further determined based on one or more measurements from one or more sensors of the mobile device.

12. The method of claim 11, wherein the one or more sensors include at least one of: an accelerometer, a gyroscope, and a compass.

13. The method of claim 10, wherein the initial position corresponds to a physical position of the physical camera when the user input is received.

14. The method of claim 10, wherein the set of physical positions of the set of objects are specified at default positions from the mobile device.

15. The method of claim 10, further comprising:
determining an angular change between the initial position of the physical camera and the current physical position of the physical camera using an orientation sensor of the mobile device.

16. The method of claim 10, further comprising:
comparing the one or more first images to the one or more second images to determine a movement vector relative to the initial position of the physical camera,
wherein determining the updated virtual position of the virtual camera based on the current physical position of the physical camera includes applying the movement vector to the initial virtual position of the virtual camera.

17. The method of claim 16, wherein determining the updated virtual position of the virtual camera based on the current physical position of the physical camera further includes scaling the movement vector before applying the movement vector to the initial virtual position of the virtual camera.

18. A non-transitory computer-readable storage medium storing instructions that, when executed by one or more processors, cause the one or more processors to:

display a map view on a display of a mobile device, the map view including a set of map objects corresponding to a location within the map view from an initial virtual position of a virtual camera;

receive user input specifying an interactive mode that uses a physical camera of the mobile device;

in response to the user input, capture one or more first images of a physical environment within which the mobile device resides using the physical camera;

determine an initial position that corresponds to a physical location of the physical camera in the physical environment using the one or more first images;

specify a set of physical positions of a set of objects of the map view relative to the initial position of the physical camera, the set of objects corresponding to the set of map objects;

display a first virtual map image on the display, the first virtual map image being overlaid on the one or more first images;

capture one or more second images of the physical environment within which the mobile device resides using the physical camera after movement of the mobile device;

determine a current physical position of the physical camera with respect to the initial position based on the one or more second images;

determine an updated virtual position of the virtual camera based on the current physical position of the physical camera;

render a second virtual map image of the set of objects based on the updated virtual position of the virtual camera; and display the second virtual map image on the display, the second virtual map image being overlaid on the one or more second images.

19. The non-transitory computer-readable storage medium of claim 18, wherein the current physical position of the physical camera is further determined based on one or more measurements from one or more sensors of the mobile device.

* * * * *